US012761637B2

(12) United States Patent
Messerschmidt et al.

(10) Patent No.: US 12,761,637 B2
(45) Date of Patent: Oct. 13, 2026

(54) COMPUTER-IMPLEMENTED METHOD FOR CREATING CONTROL DATA SETS, CAD/CAM SYSTEM, AND MANUFACTURING PLANT

(71) Applicant: TRUMPF Werkzeugmaschinen SE + Co. KG, Ditzingen (DE)

(72) Inventors: Claudius Messerschmidt, Stuttgart (DE); Rainer Schlegel, Messstetten (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 1065 days.

(21) Appl. No.: 17/944,208

(22) Filed: Sep. 14, 2022

(65) Prior Publication Data

US 2023/0004150 A1 Jan. 5, 2023

Related U.S. Application Data

(63) Continuation of application No. PCT/EP2021/056823, filed on Mar. 17, 2021.

(30) Foreign Application Priority Data

Mar. 19, 2020 (DE) ..................... 10 2020 107 623.1

(51) Int. Cl.
*G05B 19/418* (2006.01)

(52) U.S. Cl.
CPC ... *G05B 19/41885* (2013.01); *G05B 19/4188* (2013.01)

(58) Field of Classification Search
CPC .......... G05B 19/41885; G05B 19/4188; G05B 13/0265; G05B 13/027; G05B 2219/49065; G05B 19/4097; Y02P 90/02
See application file for complete search history.

(56) References Cited

U.S. PATENT DOCUMENTS

| | | | |
|---|---|---|---|
| 6,018,729 | A | 1/2000 | Zacharia et al. |
| 8,706,282 | B2 | 4/2014 | Sohmshetty et al. |

(Continued)

FOREIGN PATENT DOCUMENTS

| | | |
|---|---|---|
| CN | 103235556 A | 8/2013 |
| CN | 106557072 A | 4/2017 |

(Continued)

OTHER PUBLICATIONS

Dittrich et al. "Self-optimizing tool path generation for 5-axis machining processes" (Year: 2018).*

*Primary Examiner* — Rehana Perveen
*Assistant Examiner* — Troy A Maust
(74) *Attorney, Agent, or Firm* — LEYDIG, VOIT & MAYER, LTD.

(57) ABSTRACT

A method creates numerical control data sets for controlling machine tools. The control data sets are read from the machine tools. A first component data set representing a first component design model is received. A first numerical control data set is created for the first component data set using control program generation software, having an assessment routine using a trained machine learning algorithm with settable parameters. A first additional training data set is compiled from the component data set and the created numerical control data set. The first additional training data set is output to a training database. The machine learning algorithm is updated by setting usage-environment-specific values for the parameters determined by training the machine learning training algorithm using the training database.

17 Claims, 4 Drawing Sheets

(56) References Cited

U.S. PATENT DOCUMENTS

| | | | | |
|---|---|---|---|---|
| 2005/0251284 | A1 * | 11/2005 | Balic .................. | G05B 19/4099<br>700/182 |
| 2008/0235934 | A1 | 10/2008 | Burnett et al. | |
| 2011/0210107 | A1 | 9/2011 | Hammann et al. | |
| 2017/0154283 | A1 | 6/2017 | Kawai et al. | |
| 2018/0356793 | A1 | 12/2018 | Kanemaru et al. | |
| 2019/0018391 | A1 | 1/2019 | Rogers et al. | |
| 2020/0226301 | A1 | 7/2020 | Siu | |
| 2020/0356073 | A1 | 11/2020 | Tokushima | |
| 2021/0034798 | A1 | 2/2021 | Bruneel et al. | |
| 2021/0192368 | A1 | 6/2021 | Schall | |

FOREIGN PATENT DOCUMENTS

| | | | | | |
|---|---|---|---|---|---|
| CN | 110599287 | A | | 12/2019 | |
| CN | 115769156 | A | * | 3/2023 | ............. G06N 3/092 |
| DE | 112011100192 | T5 | | 10/2012 | |
| DE | 102016013985 | A1 | | 6/2017 | |
| DE | 102018209149 | A1 | | 12/2018 | |
| EP | 2340469 | A1 | | 7/2011 | |
| JP | 62226267 | A | | 10/1987 | |
| JP | 2001051711 | A | | 2/2001 | |
| JP | 3423040 | B2 | | 7/2003 | |
| JP | 7080746 | B2 | | 6/2022 | |
| WO | WO 2010045935 | A1 | | 4/2010 | |
| WO | WO 2019091551 | A1 | | 5/2019 | |
| WO | WO 2019103010 | A1 | | 5/2019 | |
| WO | WO 2019145515 | A2 | | 8/2019 | |
| WO | WO 2020204915 | A1 | | 10/2020 | |

* cited by examiner

COMPUTER-IMPLEMENTED METHOD FOR CREATING CONTROL DATA SETS, CAD/CAM SYSTEM, AND MANUFACTURING PLANT

CROSS REFERENCE TO RELATED APPLICATIONS

This application is a continuation of International Application No. PCT/EP2021/056823 (WO 2021/185909 A1), filed on Mar. 17, 2021, and claims benefit to German Patent Application No. DE 10 2020 107 623.1, filed on Mar. 19, 2020. The aforementioned applications are hereby incorporated by reference herein.

FIELD

The present disclosure relates to a method for creating computerized numerical control data sets for controlling machine tools. The present disclosure also relates to a CAD/CAM system and to a manufacturing plant and a machine tool.

BACKGROUND

In order to control machine tools, for example for machining metal or sheet metal, a computer-aided design system (CAD system) is used to generate a digital design model of a component to be produced. In the course of computer-aided manufacturing (CAM), the design model is used to create a computerized numerical control data set (computerized numerical control (CNC) code or CNC program) which can be transferred, in electronic (digital) form, to the control unit of a machine tool, for example a laser cutting machine, a bending machine or an additive manufacturing machine. According to the control data set, control routines for carrying out the machining (laser cutting, bending, additive manufacturing) are output to the various components of the machine tool.

The CNC program can be created using a so-called CAM system, into which the geometrical data (2D/3D design data) for the component are read in and which has access to the technology to be used (that is to say its policies and process optimizations and machine settings). The conversion of a CAD design model (2D or 3D model of a component) into a (CAM) control data set constitutes computer-aided programming which includes machining steps which take place in succession, movement paths, relative positions, parameters of the machine tool etc. The CAM system may also comprise the conversion into machine-tool-comprehensible control routines (for example G-code), wherein the CAM system may use, for example, a post-processor which has been adjusted to a specific machine tool. Alternatively, the conversion into the control routines can also be carried out in a machine tool controller. During the computer-aided programming and the conversion, the CAM system can resort to technology tables which store, for example, the operating parameters of the machine tools for different machining methods, material types, machine tool types, available tools etc.

The control data set generated is provided for the purpose of controlling a machine tool to carry out machining steps. For this purpose, the control data set can be converted by the CAM system or by the machine tool into specific machine control instructions for the CNC control. During such CNC control of a machine tool, the machine control instructions, for example in the case of a laser cutting machine or an additive manufacturing machine, set the parameters of a laser beam from a laser beam source, control a relative movement between the laser beam and the material or powder bed to be machined, and activate accompanying processes such as the supply with protective gas and/or preceding/subsequent processes such as the loading and unloading of transport apparatuses for the components.

In a CAD/CAM system, a CAD system can be integrated with a CAM system in a computer system, that is to say the creation of a component data set (CAD data relating to a component) and the programming of a control data set (CNC program) are carried out in a common computer system. Alternatively, a CAD/CAM system may be designed to read in component data sets which have already been created and to further process them using a CAM algorithm (control program generation software). That is to say, the generation of control data sets can generally be combined with the creation of component data sets in a data processing unit or can be carried out separately with the aid of a plurality of data processing units (for example set up as a cloud system).

A machining parameter proposed by the CAM system in the CAM control data set can be manually adapted if necessary. An adaptation of a parameter may result, for example, from a control simulation of a machining process according to a CAM control data set. Furthermore, an adaptation of the CAM control data set may prove to be necessary when executing the NC code on the machine tool if, for example, errors occurred in a first work sequence according to the CAM control data set or the desired quality was not achieved.

A component or an assembly of components is usually manually designed and programmed by a designer/machine programmer and adapted to the respective conditions. In this case, the designer/machine programmer requires a lot of expert knowledge of the design, the materials, the available machining methods and the available machine tools. The present disclosure provides a solution to automate this process in its entirety.

An exemplary apparatus for controlling a machining plant is known from EP 2 340 469 A1 in which an adaptation apparatus is provided and can be used to adapt machining parameters in a preset manner to the material properties of a workpiece to be machined. When machining workpieces, the use of algorithms which are based, in particular, on machine learning—for example on neural networks—is known, for example, from JP 7080746 A, U.S. Pat. Nos. 6,018,729 and 8,706,282.

SUMMARY

In an embodiment, the present disclosure provides a computer-implemented method that is carried out by one or more computers and creates computerized numerical control data sets for controlling machine tools in a usage environment. The control data sets are read in from associated machine tools for machining starting materials. The method includes: receiving a first component data set representing a digital design model of a first component; creating a first computerized numerical control data set for the first component data set using control program generation software, the control program generation software having an assessment routine which uses a trained machine learning algorithm with settable parameters, starting values of the parameters being determined by training a machine learning training algorithm which corresponds to the trained machine learning algorithm; compiling a first additional training data set from the component data set and the created computerized numerical control data set, and outputting the first additional training data set to a usage-environment-specific training database; updating the machine learning algorithm by setting usage-environment-specific values for the parameters, the usage-environment-specific values being determined by training the machine learning training algorithm using the usage-environment-specific training database; receiving a second component data set representing a digital design model of a second component; and creating a second computerized numerical control data set for the second component data set by using the control program generation software and running through the assessment routine, the machine learning algorithm whose parameters have been updated being used.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
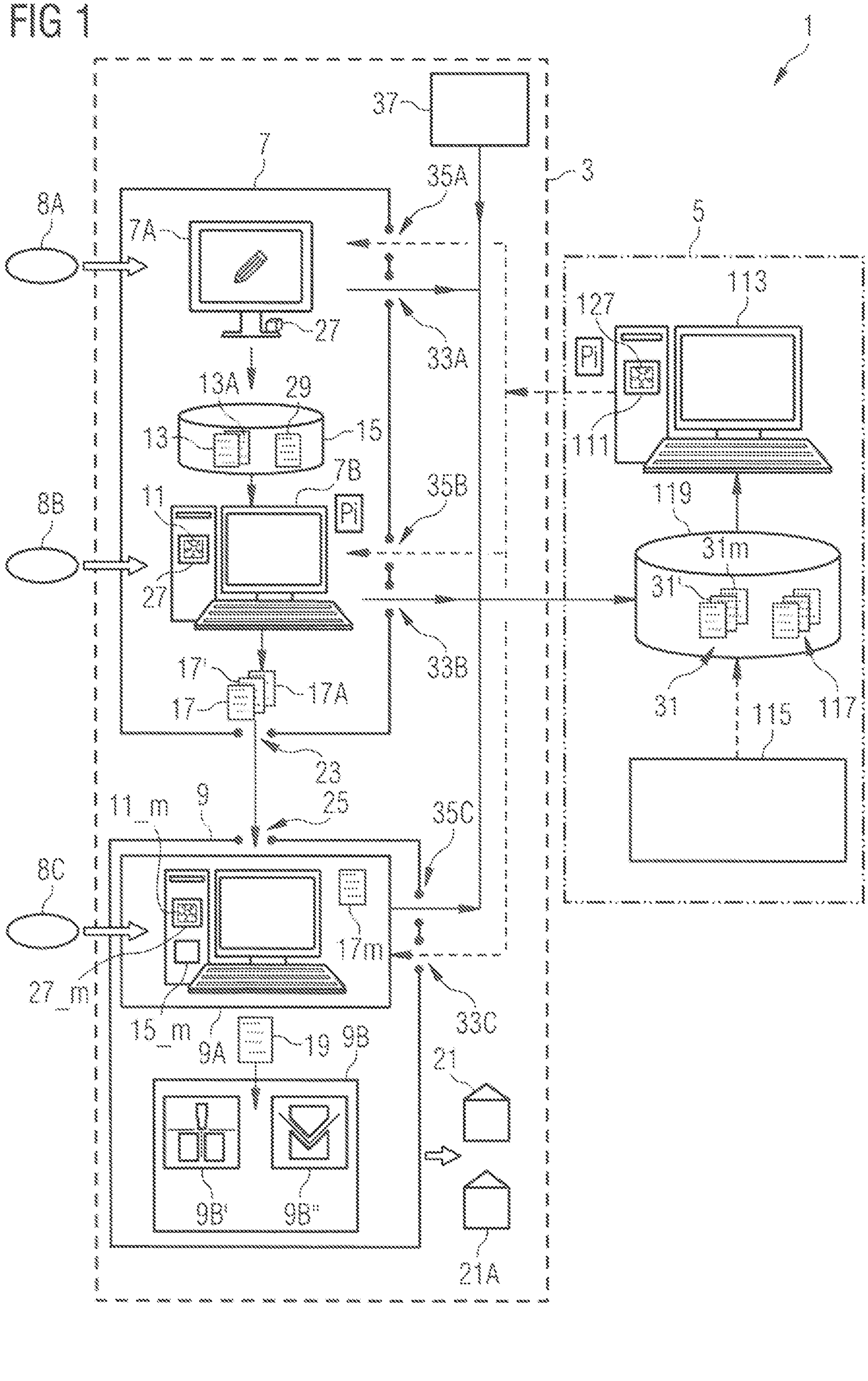
FIG. 1 shows a schematic illustration of a manufacturing plant interacting with computer-aided optimization of an algorithm.

One aspect of the present disclosure is related to improving computer-aided generation of (CAM) control data sets and adjusting this, in particular, to specific environments when using individual machine tools. In particular, aspects of the preset disclosure ensure stable, process-reliable use of machine tools in the production of components. In this case, customer-specific preferences should also be taken into account, in particular.

A further aspect of this disclosure is makes it possible to automatically generate and optimize process data and CNC programs for autonomously machining sheet metal parts on sheet metal manufacturing cells/sheet metal manufacturing machines. Process data and CNC programs are therefore specifically adapted with the aim of making machining programs faster, of higher quality and/or safer in order to be able to generally carry out more successful production. In this context, the intention is to automatically optimize or at least improve process data and CNC programs for the individual requirements of a customer or a target group.

One aspect of this disclosure is a computer-implemented method, which is carried out by one or more computers and is provided for the purpose of creating computerized numerical control data sets for controlling machine tools in a usage environment. In this case, the control data sets are read in from associated machine tools for machining starting materials, in particular for machining metal or sheet metal parts using separating, shaping and/or joining manufacturing methods. The method comprises the following steps:

receiving a first component data set representing a digital design model of a first component;

creating a first computerized numerical control data set for the first component data set using control program generation software, wherein the control program generation software comprises an assessment routine which uses a trained machine learning algorithm with settable parameters, wherein starting values of the parameters were determined by training a machine learning training algorithm which corresponds to the trained machine learning algorithm;

compiling a first additional training data set from the component data set and the created computerized numerical control data set, and outputting the first additional training data set to a usage-environment-specific training database;

updating the machine learning algorithm by setting usage-environment-specific values for the parameters, wherein the usage-environment-specific values were determined by training the machine learning training algorithm using the usage-environment-specific training database;

receiving a second component data set representing a digital design model of a second component; and creating a second computerized numerical control data set for the second component data set by using the control program generation software and running through the assessment routine, wherein the machine learning algorithm whose parameters have been updated is used.

A further aspect of the disclosure includes a CAD/CAM system for creating or receiving component data sets, each representing a digital design model of a component, and for creating computerized numerical control data sets for the component data sets, wherein the control data sets can be read in from associated machine tools for machining starting materials, in particular for machining metal or sheet metal parts using separating, shaping and/or joining manufacturing methods. The CAD/CAM system is equipped with:

at least one computer-readable storage medium for storing the component data sets and the control data sets;

a processor (for example connected to the computer-readable storage medium for reading component data sets stored on the storage medium) which has loaded control program generation software with a trained machine learning algorithm into its main memory, wherein the trained machine learning algorithm is used in an assessment routine of the control program generation software, is configured with settable parameters and is configured such that the processor carries out the method as described in one of the preceding method descriptions and creates computerized numerical control data sets for controlling at least one machine tool (and stores them on the storage medium);

a data input (for example connected to the processor) for receiving usage-environment-specific values for the parameters of the trained machine learning algorithm;

a control data output (for example connected to the processor) for outputting the created computerized numerical control data sets to the at least one machine tool, and at least one training data output (for example connected to the processor) for outputting additional training data sets which are assigned to the usage environment and are output when carrying out the method described herein.

A further aspect of the disclosure is a manufacturing plant for manufacturing components according to component data sets each representing a digital design model of a component. The manufacturing plant is configured, in particular, to machine metal or sheet metal parts using separating, shaping and/or joining manufacturing methods. The manufacturing plant comprises:

a CAD/CAM system described herein for creating computerized numerical control data sets for the component data sets; and a machine tool having a numerical machine controller and a machining unit, wherein the machine tool is used in a specific usage environment and the numerical machine controller receives the computerized numerical control data sets created by the CAD/CAM system (for example at a control data input) and converts them into control routines which are used to control the machining unit to machine a workpiece for producing components.

A further aspect of the disclosure is a machine tool having a numerical machine controller and a machining unit, wherein the machine tool is used in a specific usage environment and the numerical machine controller receives computerized numerical control data sets (for example at a control data input) and converts them into control routines which are used to control the machining unit to machine a workpiece, in particular to machine metal or sheet metal parts using separating, shaping and/or joining manufacturing methods. The machine tool comprises:

a computer-readable storage medium for storing the control data sets and component data sets on which the control data sets are based;

a processor (for example connected to the computer-readable storage medium for reading control data sets stored on the storage medium) which is configured to generate the control routines from the control data sets, wherein a computerized numerical control data set can be modified into a changed control data set by a machine tool operator of the machine tool or optionally by a trained machine learning algorithm loaded by the processor, from which changed control data set the control routines are generated, and wherein the processor is also configured to compile an additional training data set from the changed control data set and the associated component data set, which is assigned to the usage environment;

a training data output (for example connected to the processor) for outputting the additional training data set to a usage-environment-specific training database; and optionally a parameter input (for example connected to the processor) for receiving usage-environment-specific values for settable parameters of the trained machine learning algorithm.

In some embodiments, the manufacturing plant also comprises a training computer system for determining values for settable parameters of a machine learning algorithm which is used in an assessment routine of control program generation software in the CAD/CAM system. The training computer system comprises:

a computer-readable usage-environment-specific training database for storing additional training data sets, wherein the additional training data sets are output by the CAD/CAM system, in particular by a CAD system or a CAM system of the CAD/CAM system, and optionally by the numerical machine controller, a processor which has loaded a machine learning training algorithm, which corresponds to the trained machine learning algorithm used in the CAD/CAM system, and is configured to train the machine learning training algorithm on the basis of the usage-environment-specific training database and to output values for the parameters to the CAD/CAM system for use in the trained machine learning algorithm used in the CAD/CAM system.

In some embodiments, the computer-implemented method further comprises the following steps:

a machine programmer adapting the first computerized numerical control data set in order to create an adapted first computerized numerical control data set;

compiling a further additional training data set from the adapted computerized numerical control data set and the first component data set, and outputting the further additional training data set for extending the usage-environment-specific training database; and updating the machine learning algorithm by setting usage-environment-specific values for the parameters, wherein the usage-environment-specific values were determined by training the machine learning training algorithm in the usage-environment-specific training database which has been extended by the further additional training data set.

In some embodiments, the computer-implemented method further comprises the following steps:

a machine programmer adapting the second computerized numerical control data set in order to create an adapted second computerized numerical control data set;

compiling a further additional training data set from the adapted computerized numerical control data set and the second component data set, and outputting the further additional training data set for extending the usage-environment-specific training database; and updating the machine learning algorithm by setting usage-environment-specific values for the parameters, wherein the usage-environment-specific values were determined by training the machine learning training algorithm in the usage-environment-specific training database which has been extended by the further additional training data set.

The second computerized numerical control data set can be adapted by a designer by modifying the second component data set;

by a machine programmer after simulating the control of the machine tool using a simulation program for the manufacturing of the component, wherein the simulation program simulates the manufacturing using the second computerized numerical control data set; and/or by a machine tool operator after reading the second computerized numerical control data set into a numerical machine controller of the machine tool and converting the second computerized numerical control data set into a plurality of control routines, in particular after machining a starting material using a machining unit of the machine tool by controlling the machining unit using the control routines.

In some embodiments, the computer-implemented method further comprises the following steps:

training a machine learning training algorithm corresponding to the trained machine learning algorithm in the usage-environment-specific training database to generate the usage-environment-specific values of the parameters; and transmitting the usage-environment-specific values of the parameters to the control program generation software in order to update the machine learning algorithm with the usage-environment-specific values of the parameters.

In some embodiments of the computer-implemented method, the usage-environment-specific training database may store:

at least one additional training data set which traces back to a computerized numerical control data set which was created in the usage environment, and optionally one or more training data sets which were provided independently of the usage environment and, in particular, independently of a manufacturer of the machine tool.

In some embodiments of the computer-implemented method, the additional training data sets may include:

at least one geometrical definition of a section of the component, and at least one manufacturing process parameter which defines machining using the machine tool assigned to the section.

In some embodiments of the computer-implemented method, the additional training data sets may include:

machine parameters assigned to the machine tool, user parameters assigned to a user of the machine tool, and process sequence parameters assigned to the sequence of a machining process.

In some embodiments of the computer-implemented method, the additional training data sets may include data from one or more of the following fields of use and control boundary conditions:

a target group identification, in particular data relating to the customer;

machining profiles, in particular customer-specific machining profiles, containing parameters which map a machining process to a machining profile, for example to a customer-specific machining profile;

autonomous functions of a machine tool with parameters which are independently taken into account by a machine tool such as an approach lug, a contour size, an injection circuit, a cutting sequence, a measurement point, a measurement cycle and/or a tool change;

selection of an appropriate technology table such as a laser technology table and/or a policy;

optimum machine selection;

cutting time;

production costs.

In some embodiments of the computer-implemented method, the machine learning algorithm may be in the form of a neural network and may contain a plurality of neural core network layers each defined by a set of parameters as weights, and wherein the updating step in the method comprises:

updating the neural network by assigning usage-environment-specific values to the parameters, wherein the usage-environment-specific values were determined on the basis of the usage-environment-specific training database.

In some embodiments of the computer-implemented method, the machine learning algorithm may be in the form of an evolutionary algorithm, a support vector machine algorithm or an algorithm for automatically inducing a decision tree, which comprises a model which includes the parameters, and wherein the updating step in the method comprises:

updating the evolutionary algorithm, the support vector machine algorithm or the algorithm for automatically inducing a decision tree by assigning usage-environment-specific values to the parameters, wherein the usage-environment-specific values were determined on the basis of the usage-environment-specific training database.

The CAD/CAM systems, manufacturing plants and machine tools disclosed herein are configured, in particular, in such a manner that they can be used to carry out embodiments of the method according to the present disclosure. The method and optionally the embodiments of the method can be carried out by a computer program which is executed in a processor. In this case, the processor may be, for example, part of the CAD/CAM system, of the CAM system, of the manufacturing plant and/or of the machine tool. Furthermore, the computer program may be stored on a computer-readable data storage medium.

The concepts disclosed herein make it possible for the sequence when machining and producing components, in particular the production of computerized numerical control data sets, to be adapted to specific usage environments with the aid of machine learning algorithms (ML algorithms). This makes it possible to increase the production output in manufacturing plants.

Concepts which allow aspects from the prior art to be at least partially improved are disclosed herein. In particular, further features and their expediencies will become apparent from the following description of embodiments with reference to the figures.

Aspects described herein are partially based on the knowledge that artificial intelligence trained by the machine tool manufacturer for a plurality of applications (here a machine learning algorithm in the field of creating computerized numerical control data sets) can "continue to learn" when used by the customer, that is to say when a machine tool is used in a specific usage environment of the customer, as a result of which the creation of control data sets can be optimized or at least improved for the purposes of a specific customer.

In particular, the inventors have recognized that it is possible to adapt the machine learning algorithm on the basis of different customer requirements (preferably with distinct customer-specific parameters/weights in the ML algorithm) if a corresponding data cycle is incorporated in the training environment of the ML algorithm. In addition to the component-specific machining (for example providing micro joints during laser cutting), aspects of carrying out the machining in a specific usage environment, such as the material flow, time management and generally the underlying manufacturing conditions and logistics requirements, can be included in the training of the machine learning algorithm using the concepts proposed here.

The inventors therefore have provided for, inter alia, allowing AI (ML algorithm) trained by the machine tool manufacturer for a plurality of applications to individually continue to learn with the various customers in order to thus individually optimize the AI for the purposes of the respective customer. In particular, the inventors have further provided for setting up a knowledge database by forming and outputting training data sets and including them in the knowledge database in an iterative feedback cycle between the CAD system, CAM system and/or the machine controller using the training of the ML algorithm.

If the data in the knowledge database, that is to say the training data sets, are used to train AI models (ML algorithms) of the CAM system, the weights of the AI models can be adapted to the individual customer requirements over time. In this manner, technical, geometrical and product-specific patterns of the usage environment are learnt by the AI model or are included in the latter, with the result that ultimately automatically created control programs can be produced more quickly, with higher quality and/or more reliably (more error-free).

It is explained below, with reference to FIG. 1, how the aim of preferably completely autonomous creation of control programs can be tackled with the aid of such a feedback cycle, for example during sheet metal machining (separating, shaping and joining).

FIG. 1 shows a manufacturing plant 1 for manufacturing components. In order to illustrate the concepts proposed herein, the manufacturing plant is subdivided into a usage environment 3 and an ML training environment 5. The usage environment 3 relates to the process of manufacturing components. The manufacturing process can be implemented, for example, using a CAD/CAM system 7 and a machine tool 9 (or a plurality of machine tools). At least one ML algorithm 11 is used in the various manufacturing substeps. The use of the ML algorithm 11 generally requires training of the ML algorithm. This is carried out in the ML training environment 5, that is to say an ML algorithm corresponding to the ML algorithm 11 in the CAD/CAM system 7 runs through a training phase on the basis of a multiplicity of training data sets which are used to adapt parameters of the ML algorithm.

A central point proposed herein relates to the interaction between the training of the ML algorithm used and the implementation of the ML algorithm in the CAD/CAM system 7 and/or the machine tool 9.

The usage environment 3 is described below using the example of metal and sheet metal machining. During metal and sheet metal machining, components are designed in the CAD/CAM system 7. For example, component data sets 13 are created by a designer 8A using a CAD system 7A and are stored in a storage medium 15, for example. Alternatively, such a component data set 13 can be imported into the (CAD) CAM system 7A if a corresponding design has already been externally effected.

In order to produce a component 21 belonging to the component data set 13, a control data set 17 is generated for the component data set 13. This is carried out with the aid of a CAM system 7B which constitutes an interface between the design and the manufacturing with the machine tool 9 and is used to "program" the component, more specifically to machine a workpiece to form the component.

In the example in FIG. 1, the CAM system 7B generates a control data set 17 which is transmitted to a machine controller 9A of the machine tool 9 to be used. The machine controller 9A, according to the control data set 17, outputs control routines 19 to a machining unit 9B of the machine tool 9. Examples of machine tools include - for sheet metal machining - a laser machine (cutting, welding, robot, flatbed, tube cutting etc.), a punching machine and a bending machine. A further example are additive manufacturing machines, in particular machines based on laser metal fusion (LMF), electron beam melting or selective laser sintering (SLS), and deep-drawing machine tools. FIG. 1 indicates, by way of example, a laser cutting machine 9A' and a bending machine 9B". The control routines 19 cause the corresponding machining of a workpiece and, in particular, the production of the component 21 defined by the component data set 13. The control routines 19 define the manufacturing parameters to be set in each case such as punching tools, lifting force, laser power, laser wavelength, movement trajectories, material parameters etc.

In order to illustrate the data flow, FIG. 1 indicates, by way of example, a control data output 23 of the CAD/CAM system 7 and a control data input 25 of the machine tool 9 for interchanging control data sets 17. As already mentioned, control routines may alternatively be already generated in the CAM system 7B, with the result that they can be transmitted to the machine controller 9A or directly to the machining unit 9B.

Within the framework of CAD/CAM applications (software solutions for designing components and programming CNC control programs which run on one or more processors 27, for example), an ML algorithm can be used to create a suggestion for a control data set for a component geometry. In FIG. 1, this is the ML algorithm 11 which runs on the processor 27 of the CAM system 7B. An associated CAD design model (the component data set 13 in FIG. 1) and manufacturing process parameters are the input parameters for the ML algorithm 11. Manufacturing process parameters 29 for the machine tool 9 are stored, by way of example, on the storage medium 15 in FIG. 1. The ML algorithm 11 uses them to create a CAM control data set, the control data set 17 for the component data set 13 for generating the component 21 in FIG. 1. An ML algorithm generally allows a control data set to be generated for a component to be produced (CAD design model). Therefore, CAD design models relating to the CAM control data sets derived for manufacturing the corresponding components are available in the CAM system 7B.

In order to be able to use an ML algorithm when programming control data sets, a machine manufacturer will determine parameters for the ML algorithm in more detail with the aid of training data. This is illustrated in FIG. 1 on the basis of the training environment 5. The ML training environment 5 is the environment in which the ML algorithm can be trained. Training is usually effected on a training ML algorithm 111 which corresponds to the ML algorithm 11 in the CAD/CAM software. The model on which the training ML algorithm 111 is based corresponds to that of the ML algorithm 11, but the model is first trained with training data and adapted to the application. The training ML algorithm 111 is installed on a training computer system 113 which provides the required computing power and can set parameters of the training ML algorithm 111. The training ML algorithm 111 is run through for a multiplicity of input parameters and the control data sets generated are compared with target control data sets. The parameters of the training ML algorithm 111 are adapted on the basis thereof. The quality of the ML algorithm can be measured with the aid of a test and a validation data set. Such (first) training of the ML algorithm constitutes an exemplary starting point for the usage-environment-based "continued learning" of the ML algorithm proposed herein.

For the first training of the ML algorithm, the machine manufacturer carries out a large number of machining sequences (based on control data sets) in order to generate test component geometries (indicated as training production processes 115 in FIG. 1). On the basis thereof, the machine manufacturer generates manufacturer training data sets 117 in which programmed machining (CNC program) is assigned to a component geometry (component data set) in each case. Settings (values for the parameters Pi) of the training ML algorithm can be specified with the aid of the manufacturer training data sets 117. The manufacturer training data sets 117 form the start of a knowledge database which is initially still restricted to the manufacturer's environment. The manufacturer training data sets 117 are stored in a training database 119. The training computer system 113 can access the training database 119 and can optimize the parameters Pi using the manufacturer training data sets 117.

Parameters Pi of an ML algorithm trained in this manner can be used in the CAD/CAM system 7 for the ML algorithm 11 in order to generate a suggestion for a CNC program (control data set 17) for a newly planned component (new component data set 13) in an automated manner. For this purpose, the values of the parameters Pi are transmitted to the CAD system 7B and are stored by the latter in the ML algorithm 11, for example.

The disadvantage of the above-described use of an ML algorithm with parameters which have been provided by the machine manufacturer is the aspect that the component geometries and CAM control data sets on which the training is based are provided for environmental conditions which are present for the machine manufacturer, that is to say in the training manufacturing processes 115. These may differ substantially from the usage conditions for a customer, as are present in the usage environment 3.

According to an aspect of the present disclosure, the training database 119 is extended with the aid of additional training data sets 31. The additional training data sets 31 are based on control data sets created by the CAD/CAM system 7. In this case, these additional training data sets 31 based on the CAD/CAM system may be based both on a control data set 17 generated purely automatically with the aid of the ML algorithm 11 and on a control data set 17' which is first of all automatically created and then adapted by a machine programmer 8B. The additional training data sets 31 may generally take into account modifications to the component data set 13 by the designer 8A and modifications to the control data set 17 or to the final control routines 19 by the machine programmer 8B and a machine tool operator 8C. Furthermore, the additional training data sets 31 may take into account modifications to the component data set and/or to the control data set which were carried out when designing and programming the control data set or controlling the machine tool on the basis of an ML algorithm. In addition to the component data and the control data, the additional training data sets may comprise a wide variety of information which can be included in the machining in the course of the design, the programming and the manufacturing by the customer and the supplier.

During design, the additional training data sets comprise geometrical definitions of the component which usually subdivide the component into sections. A geometrical definition may relate to the shape and size of an underlying contour, for example given by a geometrical course of a surrounding sleeve, for example a parameter of a circle which surrounds the underlying contour, or a parameter of an area assigned to the underlying contour or a parameter of a diagonal line assigned to the underlying contour. Further data entries in the additional training data sets during design may relate to the underlying materials, for example layer structures and layer thicknesses or overhang angles in additive manufacturing. In addition, it is also possible to make data entries which characterize information relating to the subsequent use of a part, for example information relating to visible edges, supporting surfaces, subsequent process steps such as welding or bending etc.

Within the scope of the manufacturing using the machine tool, the additional training data sets comprise manufacturing process parameters which define machining using the machine tool. The manufacturing process parameters are usually assigned to a section of the component. Examples are edge lines, cutting lines, bending lines, application lines, joining lines, in particular spring effect compensation in the case of bending processes, for example, and required loads in the case of punching processes etc. With regard to the manufacturing, additional training data sets may comprise data entries comprising setting variables of the machine tool, machining strategies, process safety influences. The data entries may relate to collision avoidance and comprise parameters for the laser power, the cutting gas and dimensions for collision bodies.

In order to take into account the usage environment 3, the additional training data sets 31 may also include:

- machine parameters assigned to the machine tool: for example available punching tools, maximum lifting force, minimum/maximum laser power, available wavelength, protective gas use etc.
- user parameters assigned to a user of the machine tool: customer, supplier, usage time window and settings/changes, for example to process sequence parameters, carried out as standard by the user, for example giving preference to quiet movement profiles during punching etc.
- process sequence parameters assigned to the sequence of a machining process: in each case on the basis of the workpiece/construction material (sheet metal thickness, type of material, powder particle size, etc.) for laser machining, for example laser power for welding processes/cutting processes/melting processes, welding/cutting/melting speed etc.

Furthermore, data from one or more of the following fields of use and control boundary conditions may be included in the additional training data sets 31:

- a target group identification, for example data relating to the customer;
- machining profiles, in particular customer-specific machining profiles, containing parameters which map a machining process to a machining profile, for example to a customer-specific machining profile which, for a customer, specifies whether the customer wants a part to be produced “quickly” or “with high quality” or “reliably”;
- autonomous functions of a machine tool; these comprise parameters which are independently taken into account by a machine tool such as an approach lug, a contour size, an injection circuit, a cutting sequence, a measurement point, a measurement cycle and/or a tool change;
- selection of appropriate technology tables such as laser technology tables and policies in which machining parameters and machining data are stored;
- optimum machine selection;
- cutting time;
- production costs.

The additional training data sets 31 preferably form, together with the manufacturer training data sets 117, a knowledge database which is aligned with the usage environment 3 and can be used to adapt the parameters Pi of the training ML algorithm 111 to the usage environment 3. The values for the parameters Pi which result from the training of the training ML algorithm 111 can again be transmitted to the CAD/CAM system 7 and can be used to adjust the ML algorithm 11.

In order to illustrate the data flow with respect to possible additional training data sets, FIG. 1 indicates, by way of example, training data outputs 33A, 33B, 33C for the CAD system 7A, the CAM system 7B and the machine controllers 9A. The training data outputs 33A, 33B, 33C allow additional training data sets to be transmitted to the ML training environment 5, specifically the training database 119.

Exemplary parameter inputs 35A, 35B, 35C are also indicated in FIG. 1 and can be used to transmit the values of the parameters Pi determined using the training ML algorithm 111 to the usage environment 3. This relates, in particular, to the ML algorithm 11 of the CAD/CAM system 7. Optionally, however, corresponding ML algorithms can also be used in a CAD system or in the machine controllers 9A. FIG. 1 indicates, by way of example, a (machine tool) ML algorithm 11_*m* in a processor 27_m of the machine controllers 9A together with a storage medium 15-*m* of the machine controller 9A. The (machine tool) ML algorithm 11_*m* may generate, for example, a control data set 17_*m* which has been modified on the machine tool side and for which the machine controllers 9A can generate and output an additional training data set 31_*m*.

In addition to the input parameters of the ML algorithm 11, which are usually needed to create a control data set, further input parameters may be included in the additional training data sets 31 from the operation of the manufacturing plant 1. By way of example, FIG. 1 indicates that parameters from the field of logistics 37 are also included and allow, for example, the temporally efficient handling or the available materials to be included in the training of the training ML algorithm.

An adjustment of CNC programming based on an ML algorithm while rectifying the usage environment may result, for example, in many identical parts being automatically manufactured with the greatest possible process reliability for a customer A, wherein the same part is manufactured using the same machine tool for a customer B in a small quantity, but in a manner optimized for each individual component. The concepts proposed herein therefore make it possible to adapt the ML algorithm differently depending on the customer requirement. For example, on the basis of weights predefined by the manufacturer in an ML algorithm in the form of a neural network, the weights are adapted in a customer-specific manner.

Figure 2:
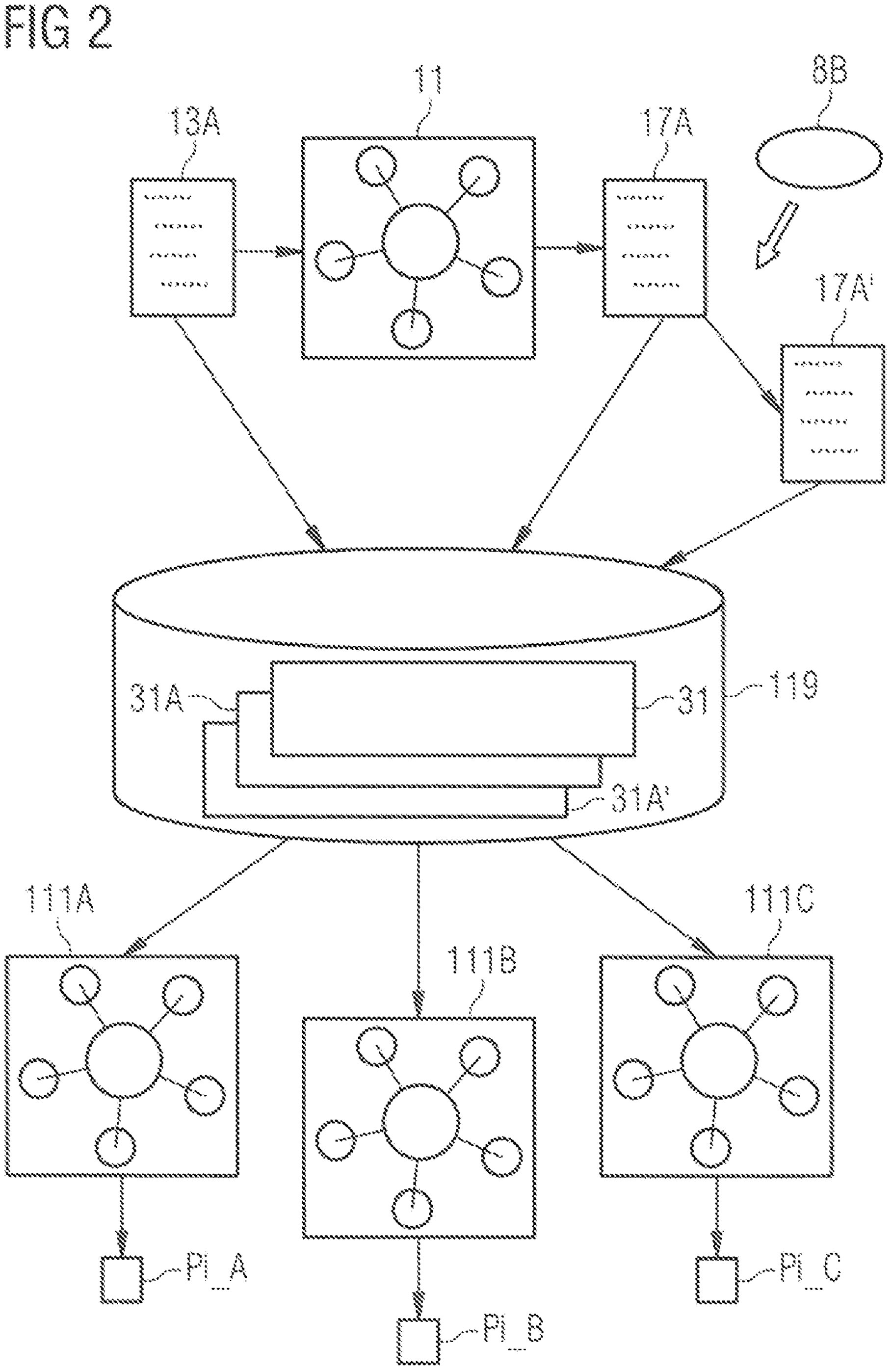
FIG. 2 shows a schematic view for illustrating the data flow when using the ML algorithm.

FIG. 2 illustrates, in the upper section, the structure of a user-specific training database ("knowledge base") and, in the lower section, the determined usage-environment-specific parameters of ML algorithms.

During operation of the manufacturing plant 1 disclosed herein, usage-environment-based continued learning of the ML algorithm 11 is carried out—proceeding from an ML algorithm 11 trained by the manufacturer. For example, component data sets are continuously received by the CAM system 7B, wherein the component data sets represent digital design models of components. The CAM system 7B generates control data sets from the component data sets. FIG. 2 indicates a component data set 13A, for which the ML algorithm 11 generates a control data set 17A. The component data set 13A and the control data set 17A may be stored as part of an additional training data set 31A in the training database 119. Furthermore, the machine programmer 8B, for example, can modify the control data set 17A, thus resulting in an adapted (computerized numerical) control data set 17A'. This can also be stored, together with the component data set 13A, as an additional training data set 31A' in the training database 119. This makes it possible to set up a comprehensive training database for a usage environment. The training database 119 may preferably be available from the manufacturer since the hardware and software infrastructure already available there can also be used to optimize the usage environment of the AI. For example, the usage environment can be optimized at intervals by predefined further additional training data sets.

The lower section of FIG. 2 illustrates how the knowledge database 119 can be used to individually respond to/process individual problem enquiries using ML algorithms when programming control data sets. For example, a plurality of ML algorithms can be used for the problem of allocating micro-joints when cutting out components using a laser cutting machine. An ML algorithm 111A is therefore provided for assessing whether or not micro-joints are needed during a process of cutting out a component, an ML algorithm 111B determines the number of necessary micro-joints and an ML algorithm 111C is used to assess positions of the micro-joints. With the aid of the concepts proposed herein, the parameters Pi_A, Pi_B, Pi_C can now be continuously adapted in a customer-specific manner for a specific usage environment with the aid of appropriate training algorithms and the training database 119. Usage-environment-specific adaptation with respect to the allocation of micro-joints may make it possible, for example, to reduce errors to less than 1-2%, for example less than 0.5%.

A further example of a usage-environment-specific adaptation relates to the chopping of residual materials (the sheet skeleton) in laser cutting processes, for example.

The additional training data sets are then each a data item for the ML algorithms. In this case, different subgroups of the entries in the additional training data sets can be used for the various ML algorithms. For example, a contour profile of the component, the number and position of corners, material properties such as weight and sheet metal thickness etc. can be included in a data item of said ML algorithms as component-specific parameters. Furthermore, machine parameters such as the current program version, on which the machining of a is based, the age of the machining unit and the embodiment variant of the machine tool may be included.

In FIG. 2, the various ML algorithms 111A, 111B, 111C were illustrated separately, but may also be combined together in a comprehensive ML algorithm which then models, for example, not only the setting of micro-joints but also the entire cutting process and moreover any further machining processes such as bending and welding in a.

It is also pointed out that AI for machine tools can usually be trained to a sufficient extent only by the manufacturer since the latter can collect the various machining possibilities during the test processes in a knowledge database. On the other hand, however, only the customer can make his specific demands on the AI in a certain usage environment. The concepts proposed herein for structuring interaction between the usage environment 3 and the ML training environment 5 for optimizing AI now allow the AI provided in a manufacturer-specific manner to continue to learn in a customer-specific manner.

A computer-implemented method implemented according to the concepts presented herein is described below with reference to FIG. 3 from the point of view of a processor of a (CAD) CAM system. The method may be carried out by at least one computer (processor) and may create computerized numerical control data sets for controlling machine tools in a usage environment, wherein the control data sets are specifically matched to this usage environment. The control data sets may be read in from associated machine tools in this usage environment for machining starting materials, in particular for machining metal or sheet metal parts using separating, shaping and/or joining manufacturing methods.

In step 201, a first component data set representing a digital design model of a first component is received (read in) in a processor of the at least one computer of the (CAD) CAM system.

In step 203, the processor creates a first computerized numerical control data set for the first component data set using control program generation software 204. The control program generation software 204 running in the processor comprises an assessment routine 204A which uses a trained machine learning algorithm (ML algorithm). The ML algorithm has a plurality of settable parameters (for example optimized/trained weights) which have been set to starting values of the parameters by training a machine learning training algorithm. In this respect, the model of the training algorithm corresponds to the model of the trained ML algorithm. The training algorithm accordingly comprises the same program structure as the ML algorithm. The training algorithm is usually installed on a computer system belonging to the manufacturer of the associated machine tool. The computer system belonging to the manufacturer provides a high computing power in order to quickly carry out the large number of training steps. The ML algorithm can generally also be used for training if it is installed on an accordingly suitable computer system and is accordingly configured to also be able to be used for training sequences.

In step 205, the processor compiles a first additional training data set from the component data set and the created computerized numerical control data set. In step 207, the processor outputs the first additional training data set to a usage-environment-specific training database. The training database is installed, for example, as part of the computer system of the training algorithm. It may be stored, for example, on a storage medium of the computer system belonging to the manufacturer. In this case too, it is the case that the training database for training which is carried out by the processor of a (CAD) CAM system can be stored on a storage medium in the usage environment.

Usage-environment-specific values for the parameters of the ML algorithm are determined by training the machine learning training algorithm using the usage-environment-specific training database. The usage-environment-specific values are transmitted to the processor, and the ML algorithm is updated in step 209 by setting usage-environment-specific values for the parameters.

The processor then receives a second component data set representing a digital design model of a second component in step 211. In step 213, the processor creates a second computerized numerical control data set for the second component data set by using the control program generation software 204 and running through the assessment routine 204A. The ML algorithm whose parameters have been updated is used in this case.

When creating control data sets, a machine programmer can set the input parameters via a programming interface of the control program generation software. The machine programmer may also possibly check and modify the control data sets created by the control program generation software 204.

For example, the first computerized numerical control data set is adapted by the machine programmer in step 203A. An adapted first computerized numerical control data set is accordingly created. In step 205A, the processor can now create a further additional training data set from the adapted computerized numerical control data set and the first component data set and can output it in order to extend the usage-environment-specific training database (step 207A). In step 209A, the processor can update the ML algorithm by setting usage-environment-specific values for the parameters, wherein the usage-environment-specific values were determined by training the machine learning training algorithm in the usage-environment-specific training database which has been extended by the further additional training data set.

In a similar manner, the second computerized numerical control data set can also be adapted by a machine programmer in a step 213A in order to create an adapted second computerized numerical control data set. Additional data can again be created and output (illustrated by the dashed arrow, also see steps 205A to 209A).

Computerized numerical control data sets can generally be adapted:

by a designer by modifying component data sets and further data entries relating to a component;

by a machine programmer after simulating the control of the machine tool using a simulation program of the CAM system for the manufacturing of the component, wherein the simulation program simulates the manufacturing using the computerized numerical control data set;

by a machine tool operator after reading the computerized numerical control data set into a numerical machine controller of the machine tool and converting the computerized numerical control data set into a plurality of control routines, in particular after machining a starting material using a machining unit of the machine tool by controlling the machining unit using the control routines.

This is indicated in step 215 in which the processor generally compiles further additional training data sets from adapted computerized numerical control data sets and associated component data sets and outputs them in step 217 in order to extend the usage-environment-specific training database.

Further training of the machine learning training algorithm can be carried out in the usage-environment-specific training database which has been extended by the additional training data sets. In a step 219, the processor updates the ML algorithm by setting the resulting usage-environment-specific values for the parameters.

Workpiece machining may be carried out, in principle, using any of the control data sets which have been generated.

Figure 3:
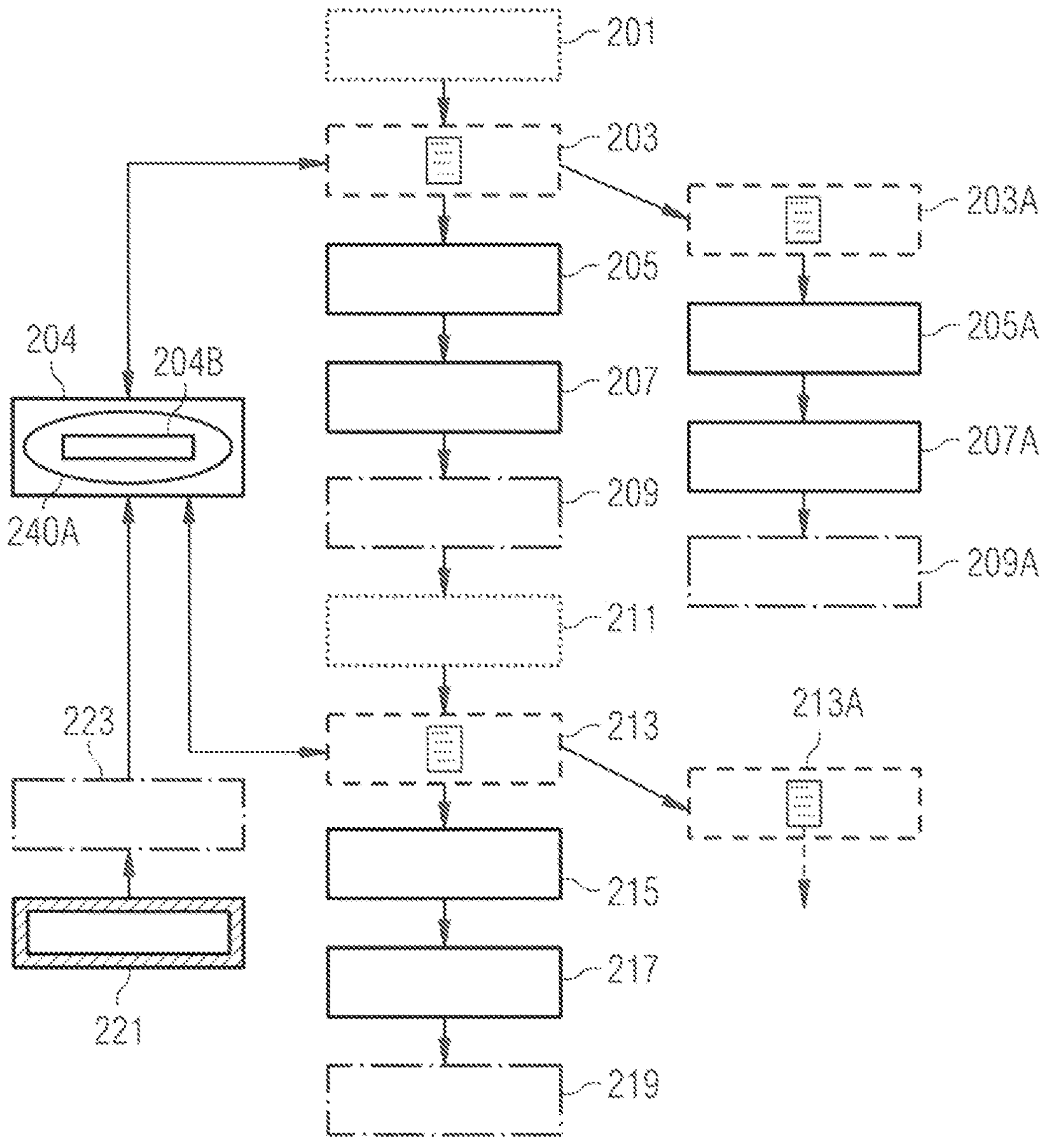
FIG. 3 shows a flowchart for illustrating the sequence of a method for creating computerized numerical control data sets for controlling machine tools in a specific usage environment.

With regard to the (periodic) updating of the ML algorithm which is carried out again and again on the basis of new additional data sets, FIG. 3 illustrates training of the machine learning training algorithm in the usage-environment-specific training database in order to generate the usage-environment-specific values of the parameters as a separate step 221. The training can be carried out by a separate training computer system or using the processor of a (CAD) CAM system. The usage-environment-specific values of the parameters which are obtained are accordingly transmitted to the control program generation software 204 in order to update (step 223) the ML algorithm using the usage-environment-specific values of the parameters. The usage-environment-specific training database may store at least one additional training data set, which traces back to a computerized numerical control data set created in the usage environment, and optionally one or more training data sets which were provided independently of the usage environment and, in particular, independently of a manufacturer of the machine tool.

In summary, the ML algorithm/an ML model is used in a plurality of phases:

1. (First) training phase: The manufacturer of machine tools trains an ML model on powerful computer systems. The ML model is trained using data from a knowledge database, in particular using data from the manufacturer. The parameters/weights of the ML model are optimized/improved in the training phase.

2. Usage phase: The finished and trained ML model (provided by the manufacturer) is used in a customer's production environment, for example is installed on a computer system belonging to the customer. This allows the customer to calculate manufacturing predictions such as classifications, regressions or clusterings within a few milliseconds. New data for the knowledge database are collected in a parallel manner in the usage phase. Said data may be obtained in the various production steps (planning, programming, machining).
3. Update phase: The ML model is retrained at periodic intervals. That is to say, parameters/weights of the ML model are retrained again and again in further training phases. After successful training, the parameters/weights are updated on the customer's computer system and a further usage phase follows.

In this cycle of a system which continues to learn, the ML model collects more and more knowledge over time and therefore becomes continually better. An update can now be carried out for all customers or specifically for a user group or even for an individual customer. In the latter case, the ML model can be adjusted, in particular, to a customer if the knowledge database is extended primarily with data relating to this customer.

The sequence for using an ML algorithm, as explained above by way of example with reference to FIG. 3, is related to two stages of implementing features of the present disclosure. This is explained below with reference to FIG. 4.

The first stage 301 is conventional (manual) operation of a machine tool, wherein conventional operation preferably already incorporates an ML model. Conventional operation is a generic training stage in which a usage-environment-specific training database (knowledge database 303) is set up. If an ML model is incorporated in the operation of the machine tool, it is possible to carry out usage-environment-specific training 221 of the ML model on the basis of component programs. In the first stage 301, conventional (manual) operation comprises the following steps:

1. Component Design within the Scope of a CAD System 305 with an Operator Interface A designer designs a component and generates a corresponding component data set (or a component data set of a previously designed component is imported). Information relating to the component is collected and transmitted to the knowledge database 303. The information comprises features 307 of the component and, in particular, features of contours of the component. The information also comprises, for example, details 309 of process-critical contours identified by the designer.

2. Component Programming within the Scope of a CAM System 311 with an Operator Interface The programming is carried out as automatically as possible. In this case, many individual steps for the machining are calculated automatically/autonomously, for example a cutting sequence, piercing points, types of piercing, approach strategies, micro joints, clearance cuts, loading and unloading strategies, collision avoidance, contour sizes, tools used, tool changes, nesting, measurement cycles, time calculation, cost calculation, etc. The individual steps form the control program (component program) belonging to the component.

During programming, at least some of the calculations can be carried out by AI models, in particular using machine learning algorithms (data-driven). The algorithm is intended to generate a production-reliable, fast and high-quality program with the associated process data for manufacturing the component. For this purpose, control program generation software comprises an assessment routine 313 which is based on one or more ML models 315 (machine learning algorithms with settable parameters) and is loaded into a processor of the CAM system 311. For example, the ML model 315 responds to a request 317 for a process-critical contour with features from the CAD system 305 and/or the CAM system 311, which is made during programming. For example, one or more ML models 315 identify one or more process-critical contours and output a respective appropriate solution 319 to the CAM system 311, which solutions are then taken into account when creating the control program.

The component program created by the algorithm is manually accepted by a machine programmer. The latter can simulate, adapt, change and optimize the complete component manufacturing. Each individual change and the final component program (final with respect to the programming) are now transmitted again as information to the knowledge database 303. The information comprises features 307' of the component and, in particular, features of contours of the component. The information also comprises details 309' of process-critical contours identified by the CAM system 311 during programming or by the programmer.

3. Manufacturing 321 with an Operator Interface of the Machine Tool

The final component program (control program) is now executed on the sheet metal working machine, for example. In this case, a machine operator now again has the possibility of revising the program. That is to say, the machine operator adapts the program in order to be able to produce the component more successfully in the usage environment thereof. Reasons may be collisions which have occurred in this case, negative feedback from the machine tool in the form of sensors, machining parameters or product-driven optimizations. Each individual change and the final component program (final with respect to the manufacturing which is ultimately carried out) are transmitted to the knowledge database.

Information relating to the manufactured component is collected and transmitted to the knowledge database 303. The information comprises features 307" of the component and, in particular, features of contours of the component. The information also comprises, for example, details 309" of process-critical contours identified by the designer.

Figure 4:
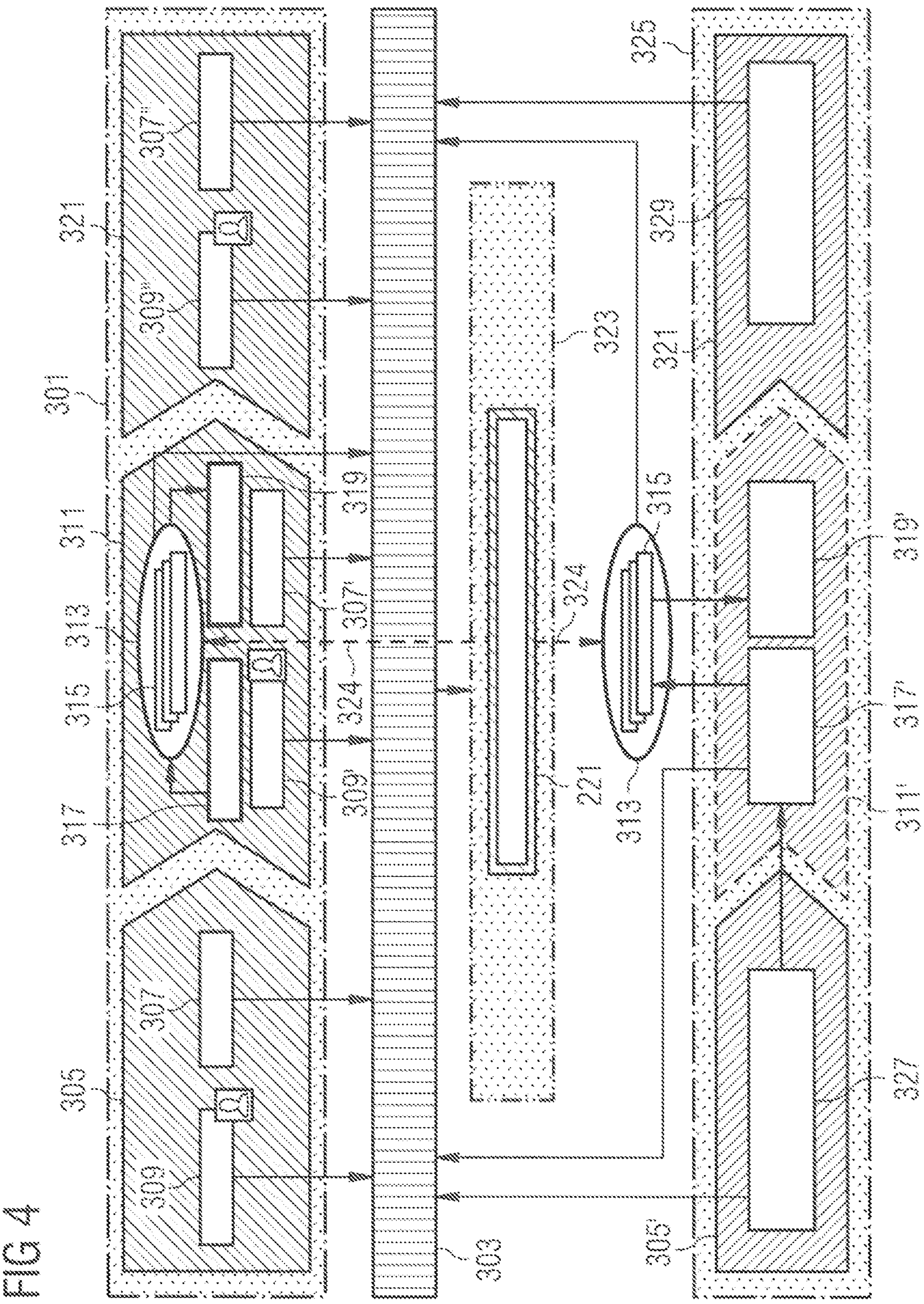
FIG. 4 shows different steps of an implementation of the concepts presented herein.

The conventional (manual) operation described results in the knowledge database 303 being set up and continuously extended (taking into account the usage environment). All data from the CAD system 305, the CAM system 311 and the machine (manufacturing 321) can be connected using a unique identification number for a component. It is therefore possible to identify whether a user has made an adaptation in any of these systems. In FIG. 4, the arrows leading to the knowledge database 303 illustrate transmissions of information/data (data streams) which belong to a component/component program and are possibly adapted by an operator—schematically indicated in FIG. 4 - in the various phases of generating CAD data, CAM control programs and final machine routines.

FIG. 4 also indicates how usage-environment-specific training 221 of a plurality of ML models (update phase 323 discussed) is carried out using the knowledge database 303. For example, a separate ML model 315 can be trained for each type of process-critical contour (for example clearance cuts and micro-joints). As a result of the training, parameters of the ML models 315 are updated (dashed arrows 324 in FIG. 4).

Two improvements, inter alia, can be achieved using the knowledge database 303 set up in this manner: On the one hand, the optimum machine process sequence can be delivered to customers and, on the other hand, the customer's behavior can be learnt and used by the algorithm when creating component programs. The aim is therefore to learn patterns of component data and component programs (which are also referred to together as additional training data sets herein) in a large volume of data and to successfully automate a large number of different products. This pattern recognition with the aid of the ML algorithm can now be used to optimize the individual process steps of component programming.

In the second (final) stage of implementing features of the present disclosure (autonomous operation 325), as indicated in FIG. 4, the result is a fully autonomous iterative sequence when programming component programs. This comprises an "autonomous" step 2' of programming components within the scope of an autonomous CAM system 311' without the intervention of an operator (since the system optimizes itself).

During component design 327 using a CAD system 305', features and operator interactions relating to a component are transmitted to the knowledge database 303 in order to optimize ML models 315 of autonomous operation 325 on the basis thereof. Information relating to the component is transferred to the autonomous CAM system 311'. When programming a control program using the autonomous CAM system 311', a request 317' for process-critical contours with features from the CAD system 305' and the CAM system 311' can be output to an assessment routine 313. The assessment routine 313 runs on its own processor, for example, as part of a cloud solution (indicated in FIG. 4) or on a processor of the autonomous CAM system 311'. One or more ML models 315 identify one or more process-critical contours and output a respective appropriate solution 319' which is taken into account by the processor when creating a control program. For example, clearance cuts and micro-joints are automatically positioned. The autonomous CAM system 311' outputs the component program (control program) to the manufacturing 321. Features and manual interventions are output, for example, by an operator interface 329 of the machine tool in order to extend the knowledge database 303 and to optimize the ML models 315 in the long term.

The individual ML algorithms and the component programming overall are improved by repeating steps 1, 2' (without the involvement of persons) and 3 and the update phase 323, with the result that autonomous production is enabled, specifically independently of the design and the machine tool used.

An ML algorithm can generally be in the form of a neural network. For example, the neural network may contain a plurality of neural core network layers each defined by a set of parameters (for example parameters Pi) as weights. Updating step 209 then comprises updating the neural network by assigning usage-environment-specific values to the parameters of the neural network, wherein the usage-environment-specific values were determined on the basis of the usage-environment-specific training database.

The ML algorithm may also be in the form of an evolutionary algorithm (genetic algorithm), a support vector machine algorithm or an algorithm for automatically inducing a decision tree, for example an ID3 algorithm or a C4.5 algorithm. It then comprises a model which includes the parameters Pi in order to define a decision tree, for example. Updating step 209 then comprises updating the ML algorithm by assigning usage-environment-specific values to the parameters of the model, wherein the usage-environment-specific values were determined on the basis of the usage-environment-specific training database.

The implementation of machine control based on an ML algorithm, as described herein, may sometimes have the following advantages:

- Manufacturing processes, subprocesses and component geometries may be reliably (partially) automated.
- ML algorithms may quickly adapt to the market or the customers in a (partially) automated manner.
- ML algorithms which were initially created for the entire market are adjusted in a customer-specific manner during use.
- Automatic programming assists programmers and machine operators with a very high level of training or a lower level of training.

The approach of using a knowledge database comprising a large amount of data, such as customer adaptations, geometrical descriptions, process data and machine data (log, sensors, etc.) enables various possible uses of ML algorithms, for example in metal and sheet metal machining.

Embodiments of the present disclosure and the functional operations described herein may be implemented in digital electronic circuits, in computer software or computer firmware, in computer hardware, including the structures mentioned herein or similar structures. Embodiments may be implemented as one or more computer programs, that is to say as one or more modules of computer program instructions which are coded for execution by or for controlling the operation of data processing devices and, in particular, machine tool controllers of machine tools.

In this case, the term "data processing unit" comprises all types of devices, apparatuses and machines for processing data, including, for example, a programmable processor, a computer or a plurality of processors or computers or computer systems. The devices may contain special logic circuits, for example an FPGA (Field Programmable Gate Array) or an ASIC (Application Specific Integrated Circuit). In addition to the hardware, the data processing unit may also contain code which provides an execution environment for the relevant computer program, for example code representing the processor firmware, a database management system, an operating system or a combination of one or more thereof.

Computer programs discussed herein (which can also be referred to as a program, software, a software application, a module, a software module, a script or code) can be written in any form of programming language, including compiled or interpreted languages, and can be used in any form, including as independent programs or as modules, components, subprograms or other units suitable for use in a computer environment. This relates, in particular, to ML algorithms which are implemented as a computer program when creating component programs. A computer program may, but need not, correspond to a file in a file system. A program can be stored in a part of a file containing other programs or data, for example one or more scripts or parameters of the program, or in a single file assigned to the relevant program or in a plurality of coordinated files, for example files which store one or more modules, subprograms or code parts. A computer program can be used in such a manner that it is executed on one computer or on a plurality of computers which are situated at one location or are distributed over a plurality of locations and are connected to one another by means of a communication network.

The methods, processes and logical sequences described herein can be executed by one or more programmable computers which execute one or more computer programs in order to perform functions by working with input data and generating outputs. The processes and logical sequences can also be executed by special logic circuits, for example an FPGA or an ASIC, and the devices may also be implemented as such.

Computer systems which are suitable for executing a computer program may be based, for example, on general or special microprocessors or on both or on any other type of central computing units. A central computing unit generally receives instructions and data from a read-only memory or a RAM memory or both. The important elements of a computer system are a computing unit for executing instructions and one or more storage devices for storing instructions and data as well as data inputs and data outputs, that is to say data interfaces which can be used to receive and output data (digital information).

A computer system generally also contains one or more devices for storing data or is operatively coupled via interfaces in order to receive data from one or more mass storage devices or to transmit data to the latter, or both. However, a computer need not have such devices. In addition, a computer may be embedded in another device, for example in a machine tool, a CAD system, a CAM system, a CAD/CAM system. The computer-readable media suitable for storing computer program instructions and data include non-volatile memories, including, for example, semiconductor storage devices, for example EPROM, EEPROM and flash memory devices. A processor and a memory can be supplemented with special logic circuits or integrated into the latter.

In order to enable interaction with an operator of the computer system, it is possible to use display devices (for displaying information) and input devices (for inputting information), such as a keyboard and a mouse, which are connected to the processor via data interfaces.

Embodiments of the concepts disclosed herein may be implemented in a computer system containing a back-end component, for example as a data server, or a middleware component, for example an application server, or a front-end component, for example a client computer with a graphical user interface or a web browser, via which a user can interact with an implementation of the programs described herein, or any combination of one or more back-end, middleware or front-end components of this type. The components of the system may be connected to one another by means of any form or any medium of digital data communication, for example a communication network. Examples of communication networks are a LAN ("local area network") and a WAN ("wide area network"), for example the Internet. The computer system may comprise clients and servers, for example. A client and a server are generally set up remotely from one another and generally interact via a communication network. The relationship between the client and the server is produced by computer programs which run on the respective computers and are in a client-server relationship with respect to one another.

It is explicitly emphasized that all features disclosed in the description and/or the claims should be regarded as separate and independent of one another for the purpose of the original disclosure and likewise for the purpose of restricting the claimed invention independently of the combinations of features in the embodiments and/or the claims. It is explicitly stated that all range indications or indications of groups of units disclose any possible intermediate value or subgroup of units for the purpose of the original disclosure and likewise for the purpose of restricting the claimed invention, in particular also as a limit of a range indication.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method, which is carried out by one or more computers, for creating computerized numerical control data sets for controlling machine tools in a usage environment, the control data sets being read in from associated machine tools for machining starting materials, the method comprising:

receiving a first component data set representing a digital design model of a first component;

creating a first computerized numerical control data set for the first component data set using control program generation software, wherein the control program generation software comprises an assessment routine which uses a trained machine learning algorithm with settable parameters, wherein starting values of the parameters were determined by training a machine learning training algorithm which corresponds to the trained machine learning algorithm;

compiling a first additional training data set from the component data set and the created computerized numerical control data set, and outputting the first additional training data set to a usage-environment-specific training database;

updating the machine learning algorithm by setting usage-environment-specific values for the parameters, wherein the usage-environment-specific values were determined by training the machine learning training algorithm using the usage-environment-specific training database;

receiving a second component data set representing a digital design model of a second component; and creating a second computerized numerical control data set for the second component data set by using the control program generation software and running through the assessment routine, wherein the machine learning algorithm whose parameters have been updated is used.

2. The computer-implemented method as claimed in claim 1, the method further comprising:

a machine programmer adapting the first computerized numerical control data set in order to create an adapted first computerized numerical control data set;

compiling a further additional training data set from the adapted computerized numerical control data set and the first component data set, and outputting the further additional training data set for extending the usage-environment-specific training database; and updating the machine learning algorithm by setting usage-environment-specific values for the parameters, wherein the usage-environment-specific values were determined by training the machine learning training algorithm in the usage-environment-specific training database which has been extended by the further additional training data set.

3. The computer-implemented method as claimed in claim 1, the method further comprising:

a machine programmer adapting the second computerized numerical control data set in order to create an adapted second computerized numerical control data set;

compiling a further additional training data set from the adapted computerized numerical control data set and the second component data set, and outputting the further additional training data set for extending the usage-environment-specific training database; and updating the machine learning algorithm by setting usage-environment-specific values for the parameters, wherein the usage-environment-specific values were determined by training the machine learning training algorithm in the usage-environment-specific training database which has been extended by the further additional training data set.

4. The computer-implemented method as claimed in claim 3, wherein the second computerized numerical control data set is adapted:

by a designer by modifying the second component data set;

by a machine programmer after simulating the control of the machine tool using a simulation program for the manufacturing of the component, wherein the simulation program simulates the manufacturing using the second computerized numerical control data set; and/or by a machine tool operator after reading the second computerized numerical control data set into a numerical machine controller of the machine tool and converting the second computerized numerical control data set into a plurality of control routines.

5. The computer-implemented method as claimed in claim 1, the method further comprising:

training a machine learning training algorithm corresponding to the trained machine learning algorithm in the usage-environment-specific training database to generate the usage- environment-specific values of the parameters; and transmitting the usage-environment-specific values of the parameters to the control program generation software in order to update the machine learning algorithm with the usage-environment-specific values of the parameters.

6. The computer-implemented method as claimed in claim 1, wherein the usage-environment-specific training database stores:

at least one additional training data set which traces back to a computerized numerical control data set which was created in the usage environment.

7. The computer-implemented method as claimed in claim 1, wherein the additional training data sets comprise:

at least one geometrical definition of a section of the component, and at least one manufacturing process parameter which defines machining using the machine tool assigned to the section.

8. The computer-implemented method as claimed in claim 1, wherein the additional training data sets comprise:

machine parameters assigned to the machine tool, user parameters assigned to a user of the machine tool, and process sequence parameters assigned to the sequence of a machining process.

9. The computer-implemented method as claimed in claim 1, wherein the additional training data sets comprise data from one or more of the following fields of use and control boundary conditions:

a target group identification relating to a customer;

customer-specific machining profiles, comprising parameters which map a machining process to a machining profile;

autonomous functions of a machine tool with parameters which are independently taken into account by a machine tool;

selection of a technology table;

optimum machine selection;

cutting time; or production costs.

10. The computer-implemented method as claimed in claim 1, wherein the machine learning algorithm is a neural network and comprises a plurality of neural core network layers, each defined by a set of parameters as weights, and wherein the updating step comprises:

updating the neural network by assigning usage-environment-specific values to the parameters, wherein the usage-environment-specific values were determined on the basis of the usage-environment-specific training database.

11. The computer-implemented method as claimed in claim 1, wherein the machine learning algorithm is an evolutionary algorithm, a support vector machine algorithm, or an algorithm for automatically inducing a decision tree, which comprises a model which includes the parameters, and wherein the updating step comprises:

updating the evolutionary algorithm, the support vector machine algorithm or the algorithm for automatically inducing a decision tree by assigning usage-environment-specific values to the parameters, wherein the usage-environment-specific values were determined on the basis of the usage-environment-specific training database.

12. A computer-aided design or computer-aided manufacturing (CAD/CAM) system for creating or receiving component data sets each representing a digital design model of a component and for creating computerized numerical control data sets for the component data sets, the control data sets being readable in from associated machine tools for machining starting materials, the CAD/CAM system comprising:

at least one computer-readable storage medium configured to store the component data sets and the control data sets;

a processor which has loaded control program generation software with a trained machine learning algorithm into its main memory, the trained machine learning algorithm being configured to be used in an assessment routine of the control program generation software, being configured with settable parameters, and being configured such that the processor carries out the method as claimed in claim 1 and creates computerized numerical control data sets for controlling at least one machine tool;

a data input configured to receive usage-environment-specific values for the parameters of the trained machine learning algorithm;

a control data output configured to output the created computerized numerical control data sets to the at least one machine tool; and at least one training data output configured to output additional training data sets which are assigned to the usage environment and are output when the processor is carrying out the method.

13. A manufacturing plant for manufacturing components according to component data sets each representing a digital design model of a component, the manufacturing plant comprising:

the CAD/CAM system as claimed in claim 12 for creating computerized numerical control data sets for the component data sets; and a machine tool having a numerical machine controller and a machining unit, wherein the machine tool is used in a specific usage environment and the numerical machine controller receives the computerized numerical control data sets created by the CAD/CAM system and converts them into control routines which are used to control the machining unit to machine a workpiece for producing components.

14. The manufacturing plant as claimed in claim 13, also having a training computer system for determining values for settable parameters of a machine learning algorithm which is used in an assessment routine of control program generation software in the CAD/CAM system, wherein the training computer system comprises:

a computer-readable usage-environment-specific training database for storing additional training data sets, wherein the additional training data sets are output by the CAD/CAM system,, a processor which has loaded a machine learning training algorithm, which corresponds to the trained machine learning algorithm used in the CAD/CAM system, and is configured to train the machine learning training algorithm on the basis of the usage-environment-specific training database and to output values for the parameters to the CAD/CAM system for use in the trained machine learning algorithm used in the CAD/CAM system.

15. A machine tool comprising;

a numerical machine controller; and a machining unit, wherein the machine tool is configured to be used in a specific usage environment, wherein the numerical machine controller is configured to receive computerized numerical control data sets and to convert them into control routines which are configured to be used to control the machining unit to machine a workpiece, wherein the machine tool further comprises:

a computer-readable storage medium configured to store the control data sets and component data sets on which the control data sets are based;

a processor which is configured to:

generate the control routines from the control data sets, wherein a computerized numerical control data set is configured to be modified into a changed control data set by a machine tool operator of the machine tool or by a trained machine learning algorithm with settable parameters loaded by the processor, from which changed control data set the control routines are generated, compile an additional training data set from the changed control data set and the associated component data set assigned to the usage environment, and update a machine learning algorithm by setting usage-environment- specific values for the parameters, wherein the usage-environment-specific values were determined by training the machine learning algorithm using a usage-environment-specific training database; and a training data output configured to output the additional training data set to the usage-environment-specific training database.

16. The computer-implemented method as claimed in claim 6, wherein the usage-environment-specific training database further stores one or more training data sets which were provided independently of the usage environment and independently of a manufacturer of the machine tool.

17. The computer-implemented method as claimed in claim 1, wherein the parameters which are independently taken into account by the machine tool such comprise an approach lug, a contour size, an injection circuit, a cutting sequence, a measurement point, a measurement cycle, or a tool change.

* * * * *